UNITED STATES PATENT OFFICE.

HENRY OBER, OF NEWARK, NEW JERSEY.

IMPROVEMENT IN COMPOSITIONS FOR WATERPROOFING AND LUBRICATING SOLES OF SHOES, &c.

Specification forming part of Letters Patent No. 215,018, dated May 6, 1879; application filed February 26, 1879.

*To all whom it may concern:*

Be it known that I, HENRY OBER, of Newark, in the county of Essex and State of New Jersey, have invented a new and useful Improvement in Compositions for Rendering Boots and Shoes Water-Proof and for Preventing their Squeaking, of which the following is a specification.

My invention relates to an improved composition to be used between the layers of the soles of boots and shoes to render them waterproof, and at the same time to prevent their squeaking, so objectionable, especially in first-class work.

The composition is composed of the following ingredients, or what may be known equivalents for them, united in about the proportions contained in the following formula.

To make six pounds of the composition, providing for some loss in preparing and boiling, I take of black-lead, twelve ounces; French chalk, thirteen ounces; tallow, three ounces; best soap, four pounds; bees-wax, thirteen ounces; some essential oil, one dram; water, four ounces. These are put together in a suitable dish over the fire, and are heated until the whole is incorporated thoroughly into one mass, when it is prepared in cakes by molding or cutting when cool, and is then ready to be packed for the market.

This article, by softening, is spread on the inner surfaces of the leather forming the soles for boots and shoes, including the slip-sole, and this will usually be done when the goods are made up or when they are repaired.

When this article is used in the manufacture of boots and shoes it will serve also for a paste to unite the sections of the sole, in place of the paste ordinarily used. This, in use, is found to render the soles impervious to water, and to prevent any squeaking in the boots or shoes. It is found also that the heat from the feet or from a stove will not impair the working of the article, but, on the contrary, it will improve it, and the composition will never injure the stitching.

I do not claim the following lubricant compound, consisting of mineral oil, soap, tallow, wax, French chalk, and black-lead, since this is not my invention; but

What I claim is—

A composition of matter to prevent the squeaking in boots and shoes, consisting of black-lead, French chalk, tallow, soap, bees-wax, essential oil, and water, substantially in the proportions herein set forth.

HENRY OBER.

Witnesses:
HORACE HARRIS,
J. P. BONNEL.